Feb. 23, 1926.
W. WITSBERGER
UNIVERSAL TRAILER HITCH
Filed Nov. 6, 1924 2 Sheets-Sheet 1
1,574,461
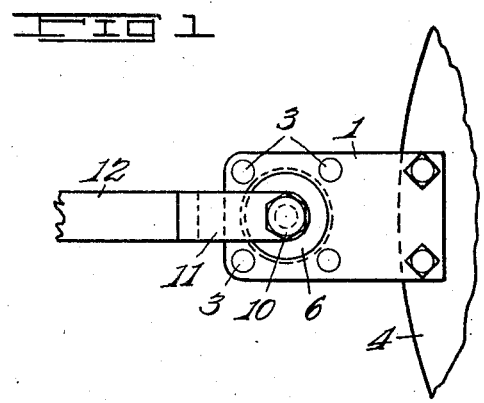
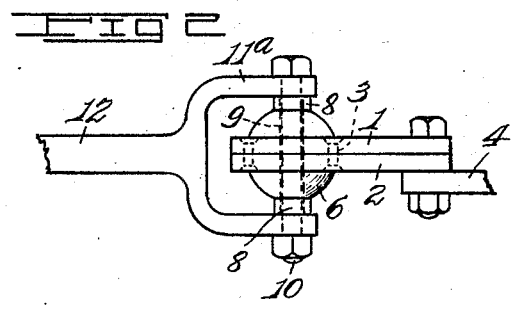
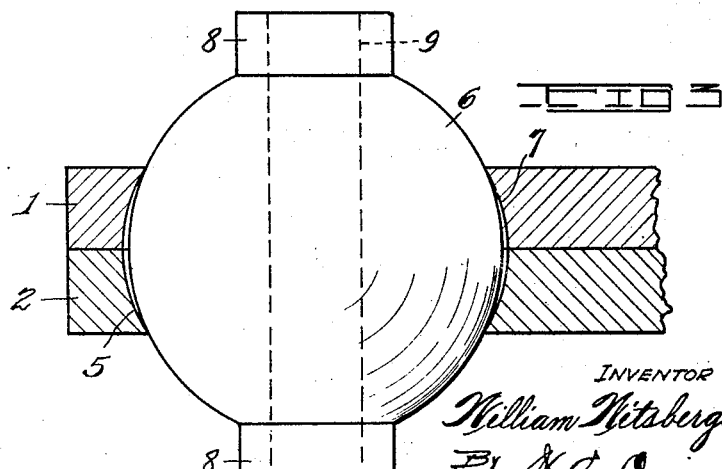

Feb. 23, 1926.
W. WITSBERGER
1,574,461
UNIVERSAL TRAILER HITCH
Filed Nov. 6, 1924
2 Sheets-Sheet 2
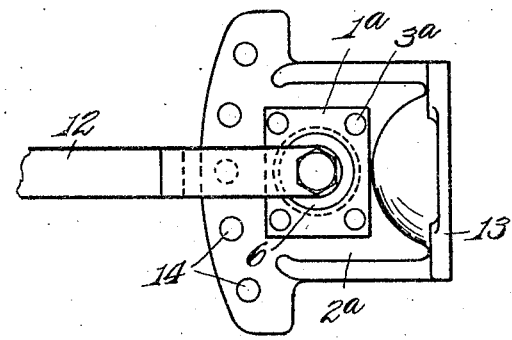
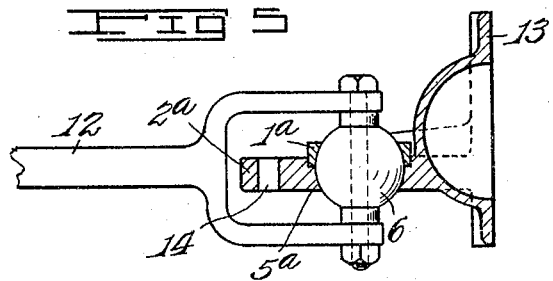
INVENTOR
William Witsberger
By N. E. Dunlap
ATTORNEY Patented Feb. 23, 1926.

1,574,461

UNITED STATES PATENT OFFICE.

WILLIAM WITSBERGER, OF WHEELING, WEST VIRGINIA.

UNIVERSAL TRAILER HITCH.

Application filed November 6, 1924. Serial No. 748,129.

*To all whom it may concern:*

Be it known that I, WILLIAM WITSBERGER, a citizen of the United States of America, and resident of Wheeling, county of Ohio, and State of West Virginia, have invented certain new and useful Improvements in Universal Trailer Hitches, of which the following is a specification.

This invention relates broadly to coupling devices, and it has for its primary object to provide a simple and improved hitch or coupling for the draw bars or draught poles by which trailers are attached to tractors or other motor propelled vehicles.

A further object is to provide a pole coupling having a construction which permits of universal relative movements either between the pole and the trailer or other implement to be drawn, or between the pole and the tractor, engine, or other draught vehicle, thereby effectually to eliminate torsional or twisting strains upon the coupled parts.

In describing the invention in detail, reference is herein had to the accompanying drawings, in which—

Figure 1 is a top plan view of the invention, applied;

Figure 2 is a side elevation of the same;

Figure 3 is an enlarged sectional elevation of the ball joint;

Figure 4 is a view similar to Fig. 1, showing a modified form of the invention, the ball being mounted in a bracket of the general type employed in a common commercial form of tractor hitch; and—

Figure 5 is a sectional elevation of the same.

Referring to the drawings, 1 and 2 indicates upper and lower companion members or plates which are adapted to be secured together, as by bolts or rivets 3, in face-to-face relation and to be carried by a mounting 4 which may be any suitable part of the rear end of the frame or chassis of a motor vehicle, hereinafter termed a tractor, or of the front end of a drawn vehicle or implement, hereinafter termed a trailer.

The lower plate 2 is apertured and the walls of the aperture are shaped to form an upwardly facing seat 5 for a ball 6. The upper plate 1 is correspondingly apertured and has the walls defining its aperture shaped to form a downwardly facing seat 7 for said ball. Said plates 1 and 2 are designed as a carrier for the ball 6, having their seats 7 and 5, respectively, engaging the ball above and below the line of greatest circumference of the latter, as shown.

The ball, which preferably has formed thereon integral diametrically opposite neck-like portions 8, has extending therethrough and through the neck portions thereof a diametrical bore 9 through which is directed a pivot pin or bolt 10 by which is attached to said ball the opposite members 11$^a$ of a yoke 11 which is formed on the adjacent end of the draw bar or coupling pole 12.

Referring to Figs. 4 and 5, 13 indicates a bracket having substantially the form employed on a well-known commercial type of tractor, the same being adapted for mounting upon the differential housing of a tractor. Said bracket carries an integral rearwardly-projecting member 2$^a$ of plate-like form to which, in the common form referred to, is pivotally attached an end of the usual draw-bar or pole, a pivot bolt being passed through any one of a plurality of holes 14 in the outer edge of said member. As modified, said member 2$^a$ has formed centrally thereof a seat 5$^a$ for the ball 6, and the latter is secured in place by a smaller plate 1$^a$ which is attached in overlying relation to said plate 2$^a$, as by means of bolts or rivets 3$^a$ and which embraces the ball above the line of greatest circumference of the latter.

It will be apparent that the ball 6 has substantially free rotary movement in any direction with respect to its mounting and throughout a range of approximately forty-five degrees, thus enabling the coupled parts unobstructedly to assume any degree of relative angularity within said range of movement of the ball. Further, the ball joint described eliminates all noise and chatter ordinarily incident to the play allowed between the parts of the usual forms of couplings employed in tractor hitches.

What is claimed is—

1. A coupling of the character described comprising attached companion plates of flat form having therein registering apertures, the defining walls of said apertures being oppositely beveled to form opposed ball seats, a ball carried by said members, said ball having rotary movement on and being retained in place by said seats, a pole having a yoke formed on its end, and a pivot pin directed axially through said ball and having its ends mounted in the opposite members of said yoke above and below said plates.

2. A tractor hitch comprising a pole having a yoke on an end thereof, a ball having therein a diametrical bore, a pivot pin projected through said bore and having the opposite yoke members attached thereto, a plate-like mounting for said ball adapted to be carried by the tractor, said mounting being apertured and having the aperture-defining walls shaped to form an upwardly facing seat for said ball, and a plate overlying and attached to said mounting for retaining said ball on said seat, said plate being apertured and having the aperture-defining wall shaped to form a downwardly facing ball seat.

3. A tractor hitch comprising a fixed bracket adapted to be carried by a tractor, said bracket having an apertured horizontal plate with its aperture-defining walls inclined to form a ball seat, a ball mounted upon said seat, a second apertured plate embracing said ball in opposing relation to the first mentioned plate for retaining the ball in place on said seat, said second plate having its aperture-defining walls forming an opposite seat, a pivot bolt directed axially through said ball and having its opposite ends projecting outward therefrom below the first plate and above the second plate, and a draught pole having a yoke-like end with the yoke members thereof attached to said projecting ends of the bolt.

4. A tractor hitch comprising a pair of plates arranged in superposed relation and carried by a tractor, said plates having corresponding apertures forming opposed ball seats, a ball received on said seats and held against displacement by said plates, said ball having a diametrical bore, and a pivot pin passed through said bore and adapted for having a draw-bar attached to its opposite ends.

In testimony whereof, I affix my signature.

WILLIAM WITSBERGER.